UNITED STATES PATENT OFFICE.

HUGH BURGESS, OF ROYER'S FORD, PENNSYLVANIA.

IMPROVEMENT IN PURIFYING WATER FROM MINES.

Specification forming part of Letters Patent No. 144,737, dated November 18, 1873; application filed November 7, 1873.

*To all whom it may concern:*

Be it known that I, HUGH BURGESS, of Royer's Ford, Montgomery county, Pennsylvania, have invented an Improvement in Treating Mine-Water, of which the following is a specification:

The object of my invention is to neutralize the free acid and dispose of the sulphate of iron in water pumped from mines, and thereby deprive it of its corrosive and other injurious properties; and this object I attain by mixing with the water the waste solution resulting from the process of boiling wood in alkali.

Water pumped from mines is charged with more or less free acid, and this is especially the case in the coal and iron mining districts of Pennsylvania, where the rivers, and especially their tributaries, are so charged with this corrosive element that boilers, tanks, &c., for containing the water, and pipes for distributing the same, as well as pumps or other machinery with which the water is brought into contact, are soon destroyed or rendered useless. For the same reason, and also owing to the presence of sulphate of iron, this water is rendered useless for dyeing, bleaching, and many other manufacturing processes. In some districts the water is of such a character that it will render steam-boilers, iron tanks, pipes, &c., useless in a few weeks; hence it becomes necessary to obtain water, at great expense, from sources to which the mine-water cannot gain access.

I have found that the free acid with which the water is charged may be most effectually neutralized by the waste solution derived from the boiling or digesting of wood, straw, and other vegetable substances in a solution of caustic soda until the latter is nearly or quite neutralized. In applying this waste solution to the mine-water, the proportion of the former to the latter will depend upon the amount of free acid and sulphate of iron contained in the water to be treated. The free acid may be disposed of by adding to the mine-water waste solution until red litmus paper applied to the mixture turns faintly blue. In order to dispose of the sulphate of iron, waste solution must be added until all precipitation ceases; and this precipitation may be aided by boiling the water previously to or during the addition of the waste solution.

I claim as my invention—

The treatment of mine-water by the admixture therewith of the waste solutions derived from the boiling of wood and other vegetable matter in alkaline solution, as set forth.

In testimony whereof I have signed my name to this specification in the presence of two subscribing witnesses.

HUGH BURGESS.

Witnesses:
WM. A. STEEL,
J. SHERBORNE SINGER.